United States Patent [19]
Powell

[11] Patent Number: 6,155,291
[45] Date of Patent: Dec. 5, 2000

[54] BACKFLOW PREVENTION APPARATUS

[75] Inventor: Douglas H. Powell, Sacramento, Calif.

[73] Assignee: Hunter Innovations, Sacramento, Calif.

[21] Appl. No.: 09/383,583

[22] Filed: Aug. 25, 1999

[51] Int. Cl.[7] ............................. F16K 15/03; F16K 31/08
[52] U.S. Cl. ........................ 137/527.8; 137/512; 251/65
[58] Field of Search ................................ 137/512, 527.2, 137/527.8; 251/65

[56] References Cited

U.S. PATENT DOCUMENTS

| | | | |
|---|---|---|---|
| 2,630,294 | 3/1953 | Ericson et al. ............................. | 251/93 |
| 2,842,150 | 7/1958 | Olson ....................................... | 137/87 |
| 3,265,062 | 8/1966 | Hesse ..................................... | 251/65 X |
| 3,294,115 | 12/1966 | Koenigsberg et al. ................. | 137/527 |
| 3,417,795 | 12/1968 | Hesse ..................................... | 251/65 X |
| 3,422,841 | 1/1969 | Farrer ...................................... | 137/461 |
| 3,891,000 | 6/1975 | Melnick ............................... | 251/65 X |
| 3,905,391 | 9/1975 | Oakes ................................... | 251/65 X |
| 3,974,854 | 8/1976 | Kurpanek ................................ | 137/512 |
| 4,063,570 | 12/1977 | Mitchell et al. ................. | 137/527.8 X |
| 4,270,559 | 6/1981 | Wallberg ................................. | 137/15 |
| 4,313,462 | 2/1982 | Adamson .............................. | 137/512.1 |
| 4,332,271 | 6/1982 | Rohr ........................................ | 137/315 |
| 4,874,012 | 10/1989 | Velie ....................................... | 137/557 |
| 4,893,654 | 1/1990 | Feuz ..................................... | 137/614.2 |
| 5,203,365 | 4/1993 | Velie ..................................... | 137/454.2 |
| 5,236,009 | 8/1993 | Ackroyd ................................ | 137/527 |
| 5,385,166 | 1/1995 | Dunmire et al. ..................... | 137/512 X |
| 5,503,176 | 4/1996 | Dunmire et al. ..................... | 137/512 X |
| 5,524,663 | 6/1996 | Walsh et al. ............................. | 137/15 |
| 5,584,315 | 12/1996 | Powell ..................................... | 137/315 |
| 5,713,389 | 2/1998 | Wilson, Jr. et al. ............. | 137/527.8 X |
| 5,785,077 | 7/1998 | Rice ....................................... | 137/315 |
| 5,794,655 | 8/1998 | Funderburk et al. ............. | 137/527.2 X |
| 5,947,152 | 9/1999 | Martin et al. ........................ | 137/527.2 |

FOREIGN PATENT DOCUMENTS

| | | | |
|---|---|---|---|
| 63-30667 | 7/1986 | Japan ................................ | F16K 1/22 |
| 64-21287 | 7/1987 | Japan .............................. | F16K 37/00 |
| 1194358 | 6/1970 | United Kingdom ............ | F16K 31/06 |

OTHER PUBLICATIONS

Backflow Prevention brochure, Cla–Val Company, 1978.

*Primary Examiner*—John Rivell
*Assistant Examiner*—Meredith H. Schoenfeld
*Attorney, Agent, or Firm*—Sierra Patent Group, Ltd.

[57] ABSTRACT

A dual check valve backflow prevention apparatus of lightweight, compact construction which provides low flow losses and which maintains a small positive pressure differential under static flow conditions via use of a magnetic valve closure mechanism. The apparatus comprises a main valve housing which contains two check valve assemblies. Each check valve assembly has a clapper valve which uses a low friction magnetic pull closure force and drip tight seals in the forward flow direction for maintaining a small positive pressure differential under static conditions. The magnetic bias for the closure force is preferably located in the center of the flow stream. An additional closure force may be provided by a spring or gravity assistance.

17 Claims, 6 Drawing Sheets

BACKFLOW PREVENTION APPARATUS

BACKGROUND OF THE INVENTION

1. Field of the Invention

The present invention pertains generally to devices, assemblies and systems for backflow prevention, and more particularly to a compact, light weight, low maintenance dual check valve backflow prevention apparatus of modular construction which provides low flow losses.

2. Description of the Background Art

Backflow prevention devices are widely used to prevent undesirable flow reversal under low flow, static or backpressure situations wherein clean upstream fluid sources can be contaminated by downstream fluid. Backflow prevention devices typically comprise one or two check valves, housed within a valve body, which undergo closure under backflow, backpressure or back siphonage conditions. The use of backflow prevention devices is generally required by law for cross-connected water supplies where potable water could undergo contamination due to flow reversal or back pressure conditions.

Currently used double check valve backflow preventers have proved deficient in various respects. Particularly, such back flow preventers are prone to relatively high flow losses due to the valve configurations and closure mechanisms employed, especially under low flow conditions. Further, back flow preventer assemblies typically require a bulky, heavy cast housing with a side port tube or extension and a separately cast port cover. This type of housing is expensive to manufacture and requires a substantial amount of space to accommodate the side port tube and cover. The check valves are typically bolted to seats within the housing, and can only be reached through the side port tube, which hinders access to the check valves. Maintenance and replacement of the check valves requires a person to reach through the side port tube and loosen bolts, compression rods or other internal hardware in order to remove the check valves, and thus tends to be a difficult and expensive operation. Still another drawback of presently used back flow preventers is that the check valves typically use complex, bulky, spring-biased closure mechanisms which require frequent maintenance and which can result in high flow losses due to friction.

Accordingly, there is a need for a backflow prevention apparatus which is compact and light weight, which is easy and inexpensive to manufacture, which does not have a side port tube, which provides easy access to internal check valves, which has check valves with simple, low-friction closure mechanisms, and which provides low flow losses. The present invention satisfies these needs, as well as others, and generally overcomes the deficiencies found in the background art.

SUMMARY OF THE INVENTION

The invention is a double check valve backflow prevention apparatus of lightweight, compact, modular construction which provides low flow losses and which maintains a small positive pressure differential under static flow conditions. In general terms, the invention comprises a valve housing which defines a flow stream, first and second check valve assemblies positioned within the valve housing in the flow stream, magnetic bias means, associated with each of the check valve assemblies and centrally located within the flow stream, for exerting a closure force on the check valves, on said clappers, and drip tight means, associated with the check valve assemblies, for maintaining a small positive pressure differential under static conditions. The first and second check valve assemblies each preferably comprise a clapper and a seat, with the magnetic bias means positioned to exert a closure force on the clapper. An auxiliary bias means may additionally be employed with the first and second check valves for providing an additional closing force on the clappers.

By way of example, and not of limitation, the check valve assemblies are preferably modular in structure, and fit within a flangeless side or lateral opening in the valve housing. A central component or module fits between the check valve modules, and the combined valve housing, check valve modules, and central module define a complete valve body when assembled. Seal means are provided between the check valve modules and the main valve body, and between the central module and check valve modules, to keep the assembled apparatus fluid tight.

The drip tight means preferably comprises a lip and a resilient seal, associated with the clapper and seat of each check valve assembly, with the lip being structured and configured to sealingly engage the resilient seal. The auxiliary bias means preferably comprises hinge means for pivotally coupling the clapper to their respective seats such that gravity acts as a secondary or auxiliary closure force on the clappers.

The main housing component is of generally straight, tubular construction. The side opening is extensionless or flangeless so that no lateral extension or protrusion is present on the main housing component. The assembled main is housing component, check valve modules and central module provide a relatively streamlined check valve assembly which is compact and light weight. Each check valve module preferably includes a housing section or component which is generally integral to the seat portion. The seat portions are preferably structured and configured to define a venturi shaped flow path adjacent to the attached clapper, with the magnetic bias means for each check valve module being located in generally the center of the thusly defined flow paths.

The magnetic bias means is preferably arranged such that each clapper has a centrally located magnet, and each seat portion has a corresponding centrally located, opposing magnet, with the magnet on the clapper and the magnet on the seat portion being structured, configured and positioned to exert an attractive, "pulling" force to provide a closure force for the clapper. The dual opposing magnets do not come into contact during closure of the clapper against the seat, and thus provide a closure mechanism with minimal friction losses and avoid fouling problems. The drip tight means preferably includes an annular seal on each clapper, which engages a corresponding annular lip on the seat portion when the clapper is closed, to provide a drip tight seal in the forward flow direction. The magnetic closure force is "self-aligning" so that, upon closure, the clapper seal is optimally positioned against the seat. The closure force for the check valves provided by the dual opposing magnets is preferably a primary closing force, and a second closure force by gravity or a spring or an elastic member.

The apparatus of the invention is assembled by placing the upstream and downstream check valve modules into the lateral opening of the main housing component, and respectively positioning the upstream and downstream check valve modules so that the housing sections on the modules are respectively adjacent the upstream and downstream edges of the lateral opening. The check valve modules are structured and configured such that, once positioned adjacent the upstream and downstream edges of the lateral opening, the check valves are properly located within the main housing component in generally the center of the flow stream. The central housing component or module is then placed within the lateral opening between the upstream and downstream check valve modules. The central housing module is held in place by a single bolt which extends laterally through the main housing component and into the central housing module. The central housing module, check valve modules and main housing component are structured and configured such that, when assembled, each component or module is held securely in place by the adjacent component or module. The central module and check valve modules may additionally be secured together by a bolt. The central housing component and the housing sections on the upstream and downstream check valve modules effectively cover or fill the lateral opening and define a part of the overall housing or body of the apparatus. The seal means are preferably provided by 0-rings or other elastomeric seals positioned between the central housing component the check valve modules, and between the check valve modules and the primary housing component or body so that the assembled structure is fluid-tight. The modular nature of the apparatus of the invention allows for small, light weight construction and easy manufacture and assembly, and provides a compact, portless valve body when fully assembled.

The check valve modules are held in position with respect to the main housing component by the interposed central housing component, and additional hardware is not needed to hold the check valves in place in the main housing body. In order to repair or replace the check valves, one need only unfasten and remove the central housing component from the main housing component in order to remove or access the check valve modules. Since the lateral opening does not have a side extension or flange, the check valves are easier to reach than in conventional double check valve backflow prevention devices. Also, since the check valve modules are held in place by the central housing component itself, no further disassembly is need to detach and remove the check valves. The present invention thus eliminates the difficulty of accessing check valves through a side port extension which occurs in conventional, previously available backflow prevention devices.

The centrally located, dual, mutually attractive magnets, together with the annular lip and seal, provide drip tight means, in the forward flow direction, for maintaining a generally small positive pressure differential under static flow conditions. The use of a magnetic pull force for valve closure, with dual, opposing, centrally located magnets provides excellent operating properties under low flow rate conditions and results in very small flow losses. The size and location of the dual opposing magnets allows the clappers to open at a relatively wide angle for greater flow when the check valves are open. The minimal friction of the magnetic closure arrangement of the invention provides for an optimized flow curve and reduced hysteresis. The non-contacting arrangement of the dual opposing magnets in the closed position avoids potential fouling problems in the closure mechanism. The absence of springs or other complex valve closure mechanisms avoids mechanical problems and reduces maintenance requirements.

An object of the invention is to provide a backflow prevention apparatus which is compact and light weight.

Another object of the invention is to provide a backflow prevention apparatus which is easy and inexpensive to manufacture.

Another object of the invention is to provide a backflow prevention apparatus of modular construction.

Another object of the invention is to provide a backflow prevention apparatus which does not have a side port tube.

Another object of the invention is to provide a backflow prevention apparatus which does not require a formed port cover.

Another object of the invention is to provide a backflow prevention apparatus which allows quick and easy access to check valves for service, repair and replacement.

Another object of the invention is to provide a backflow prevention apparatus which uses a magnetic pull force for closure of check valves.

Another object of the invention is to provide a backflow prevention apparatus which experiences minimal wear and requires low maintenance.

Another object of the invention is to provide a backflow prevention apparatus which has low friction losses.

Another object of the invention is to provide a backflow prevention apparatus which utilizes venturi-shaped check valves for optimal flow properties.

Another object of the invention is to provide a backflow prevention apparatus which maintains a small positive pressure differential under static flow conditions.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Referring more specifically to the drawings, for illustrative purposes the present invention is embodied in the apparatus shown generally in FIG. 1 through FIG. 9. It will be appreciated that the apparatus may vary as to configuration and as to details of the parts without departing from the basic concepts as disclosed herein. The invention is disclosed generally in terms of backflow prevention. However, it will be readily apparent to those skilled in the aft that the invention may be applied in various situations wherein check valves are used to interrupt fluid flow under selected conditions.

Referring now to FIG. 1 through FIG. 9, a backflow prevention apparatus 10 in accordance with the invention is generally shown. Backflow prevention apparatus 10 comprises a main or primary housing body or component 12, a first, upstream check valve assembly, module or component 14, a second, downstream check valve assembly, module or component 16, and a central housing component or module 18. Primary housing component 12 is of generally tubular structure and configuration and defines a generally tubular valve body for the apparatus 10. Primary housing component includes a laterally facing opening 20, and includes coupling grooves 22, 24 at its upstream end 26 and downstream end 28 respectively. Fluid flow through backflow prevention apparatus 10 moves from upstream to downstream as indicated by flow arrow F. Opening 20 is preferably flangeless as shown.

Figures 1, 2:
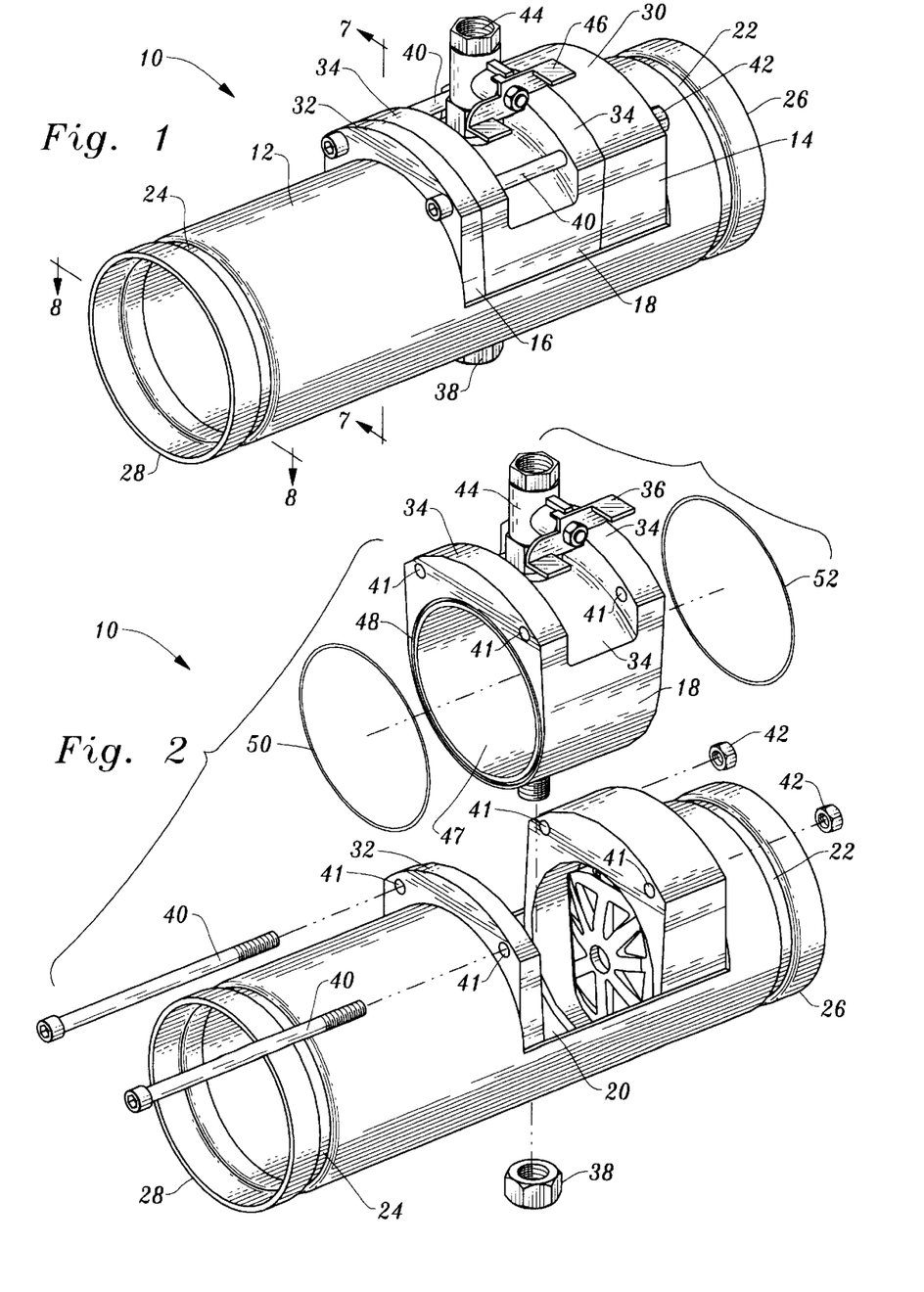
FIG. 1 is a perspective view of a backflow prevention apparatus in accordance with the present invention.
FIG. 2 is a partially exploded view of the backflow prevention apparatus of FIG. 1.
Figure 3:
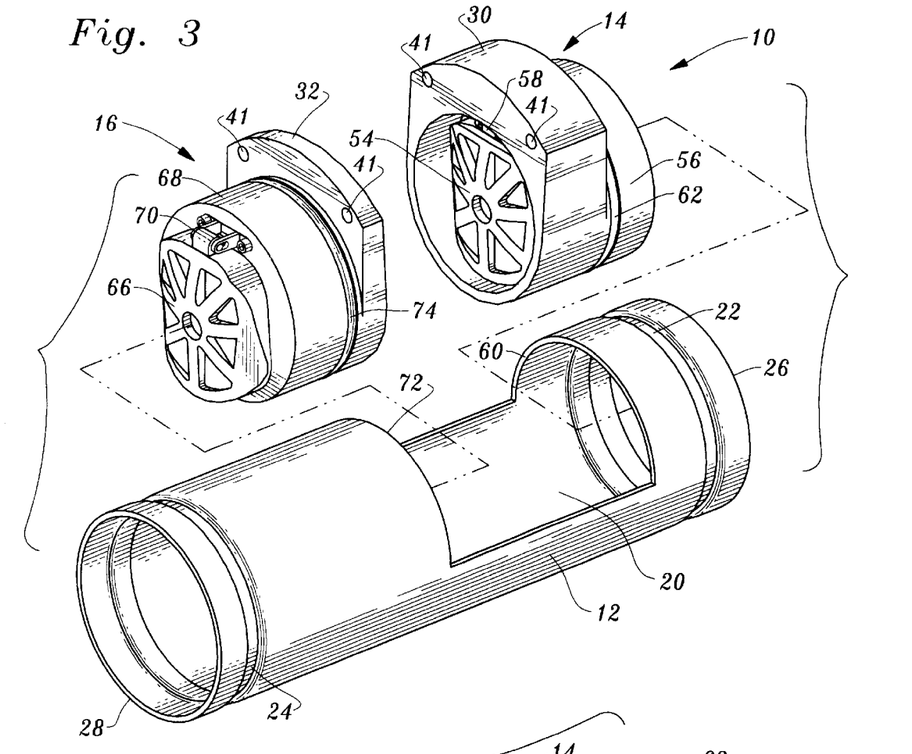
FIG. 3 is a partially exploded view of the backflow prevention apparatus of FIG. 1 shown without the central housing module.

First check valve module 14 includes a housing or wall section 30, second check valve module 16 includes a housing or wall section 32, and central housing module 18 includes a housing or wall section 34. The housing sections 30, 32, 34 of modules 14, 16, 18, together with primary housing component 12, define a generally complete valve body for the backflow prevention apparatus 10 when assembled, as described further below. Central housing module 18 is coupled to primary housing component 12 via bolt 36 and nut 38. Bolts 40 extend through bores 41 and threadedly engage nuts 42 to couple check valve modules 14, 16 to central housing module 18. Central housing module 18 preferably includes a vent 44 and hand actuated vent valve assembly 46. Central housing module is of generally cylindrical shape and is structured and configured to conform to the internal bore of primary housing component 12. Central hosing component 18 has a truncated tubular shape and defines a generally tubular flow path 47 extending therethrough. An annular groove 48 in central housing module 18 accommodate a resilient o-ring 50 which provides fluid tight sealing means between central housing module 18 and second check valve module 16. A resilient o-ring 52 is accommodated in a like annular groove (not shown) to provide fluid tight sealing means between central housing module 18 and first check valve module 14.

Figure 4:
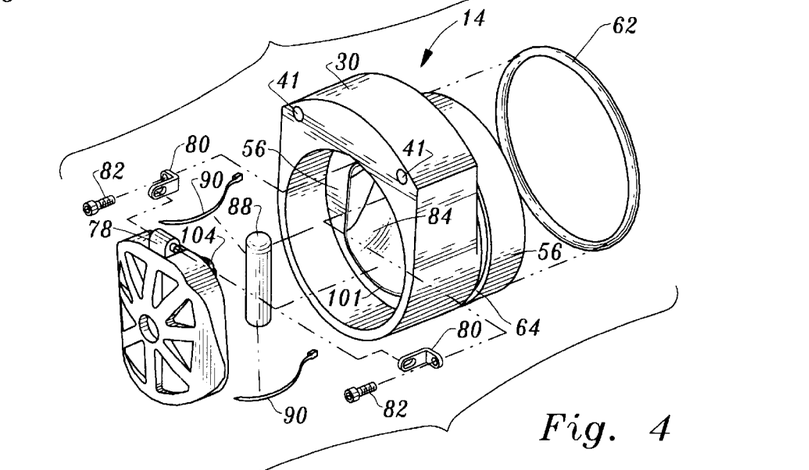
FIG. 4 is a partially exploded view of the upstream check valve module of FIG. 3.
Figure 5:
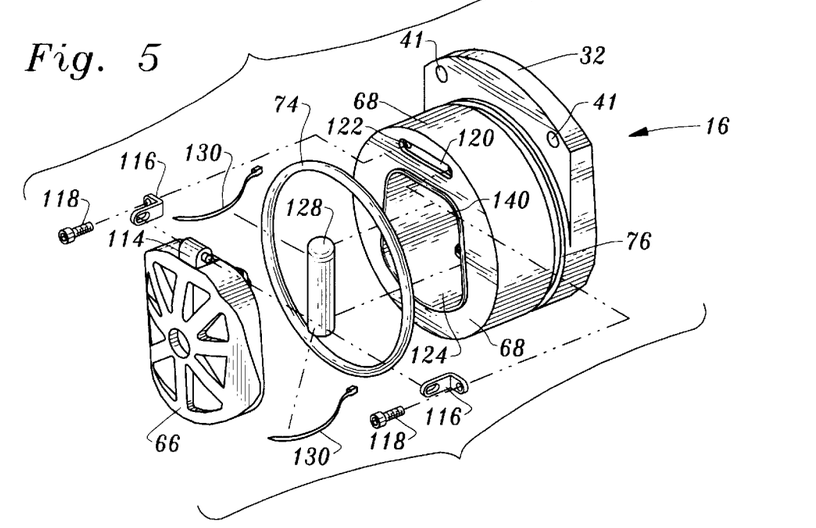
FIG. 5 is a partially exploded view of the downstream check valve module of FIG. 3.

Referring more particularly to FIG. 3 through FIG. 5, upstream check valve module 14 includes a clapper 54 and a seat 56, with clapper 54 pivotally coupled to the top edge of seat 54 by a hinge assembly 58. The external shape of seat 56 is structured and configured to generally match the internal bore of tubular primary housing component 12. When the backflow prevention apparatus 10 is fully assembled as described further below, seat 56 of upstream check valve module 14 is positioned within primary housing component 12 upstream from lateral opening 20, while housing or wall section 30 of upstream check valve module 14 is positioned within lateral opening 20 adjacent upstream edge 60. A resilient o-ring 62 fits within groove 64 (FIG. 4) on seat 56 to provide fluid tight sealing means between upstream check valve module 14 and primary housing component 12.

Downstream check valve module 16 likewise includes a clapper 66 and seat 68, with clapper 66 pivotally coupled to seat 68 by hinge assembly 70. The external shape of seat 68 is structured and configured to conform generally to the internal bore of primary housing component 12, and when the apparatus 10 is assembled, seat 68 of downstream check valve module 16 is positioned in primary housing component 12 downstream from lateral opening 20, with housing or wall section 32 positioned adjacent the downstream edge 72 of lateral opening 20. A resilient o-ring 74 within groove 76 (FIG. 5) provides fluid tight sealing means between downstream check valve module 16 and primary housing component 12.

Figure 7:
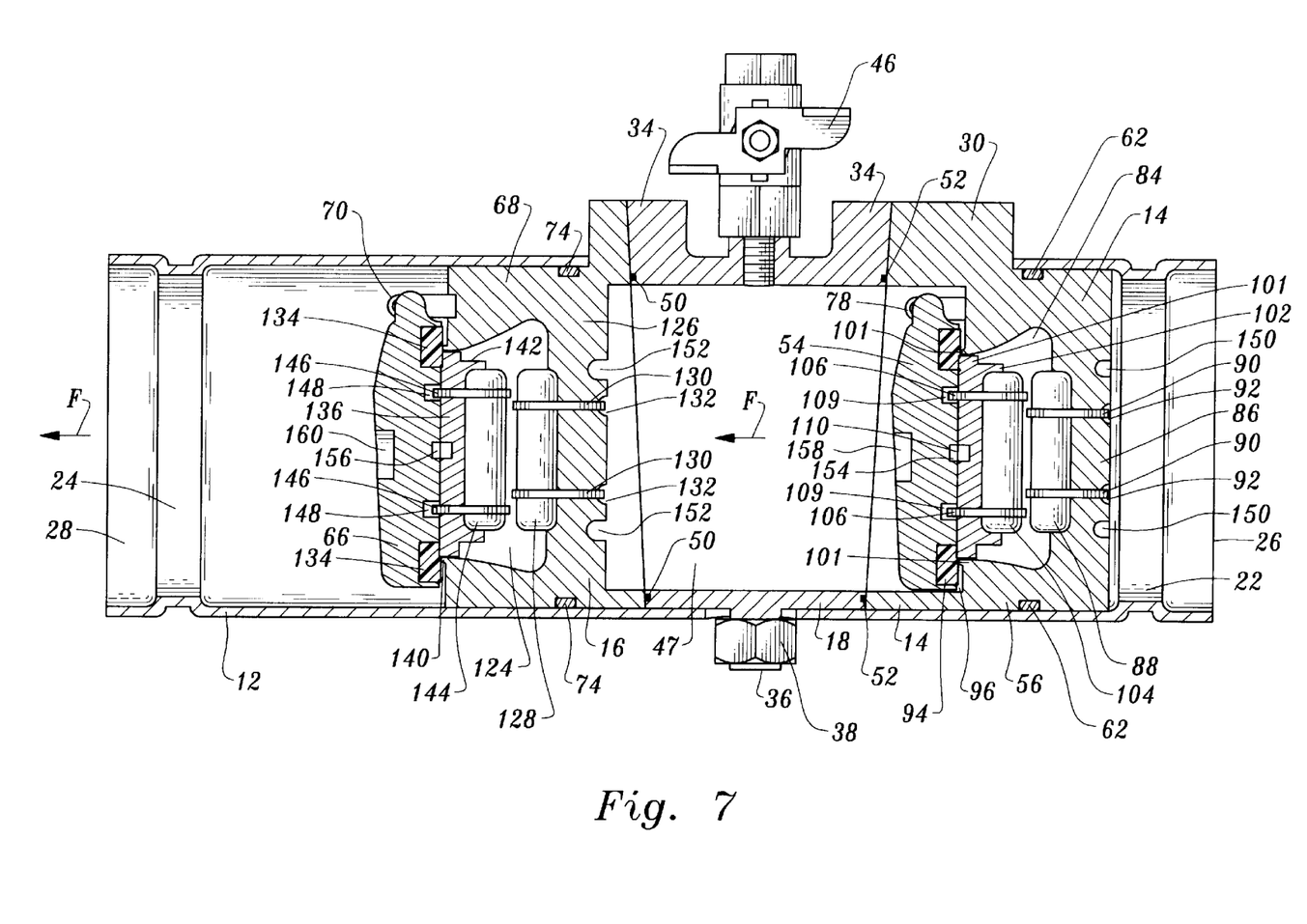
FIG. 7 is a side elevation view of the backflow prevention apparatus of FIG. 1 shown in cross-section through line 7—7, showing the check valves in a closed or static position.
Figure 8:
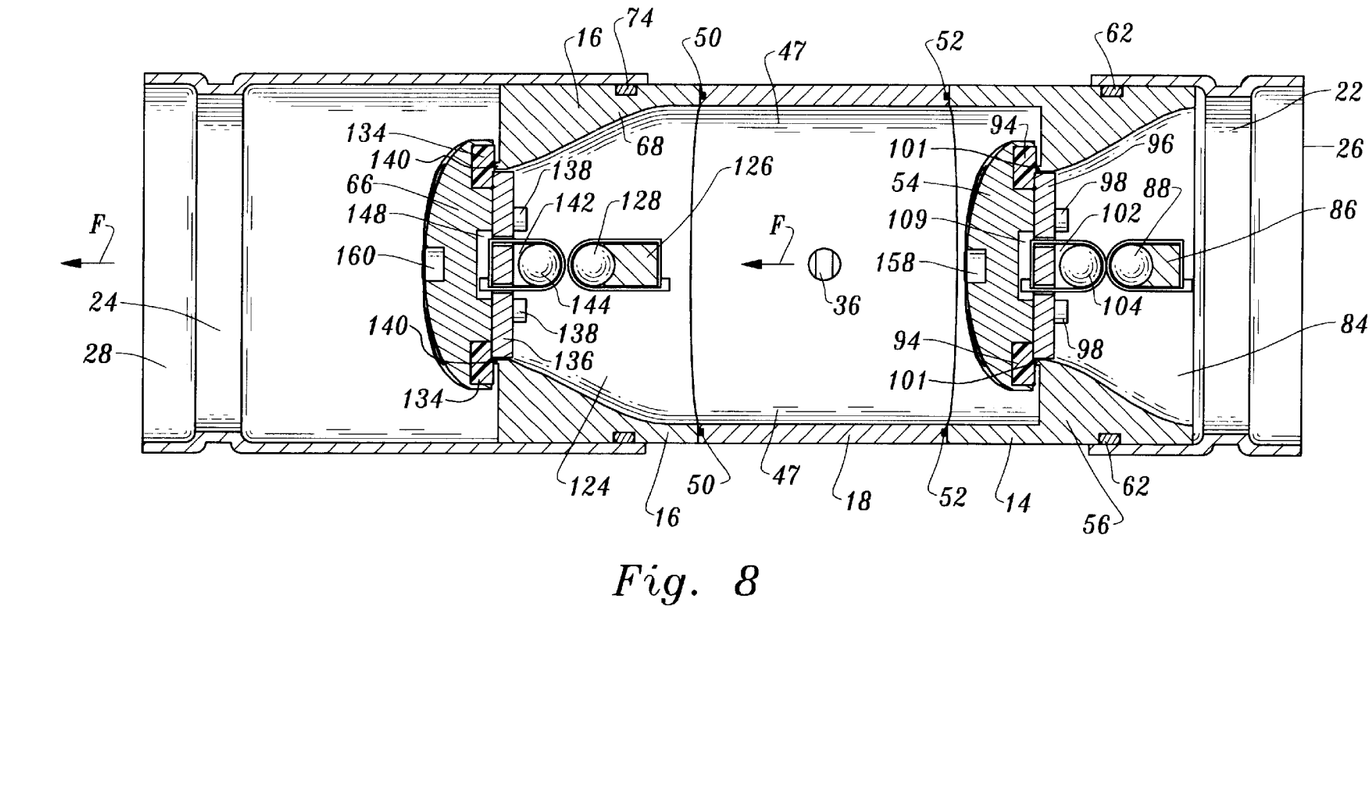
FIG. 8 is a top plan view of the backflow prevention apparatus of FIG. 1 shown in cross-section through line 8—8.
Figure 9:
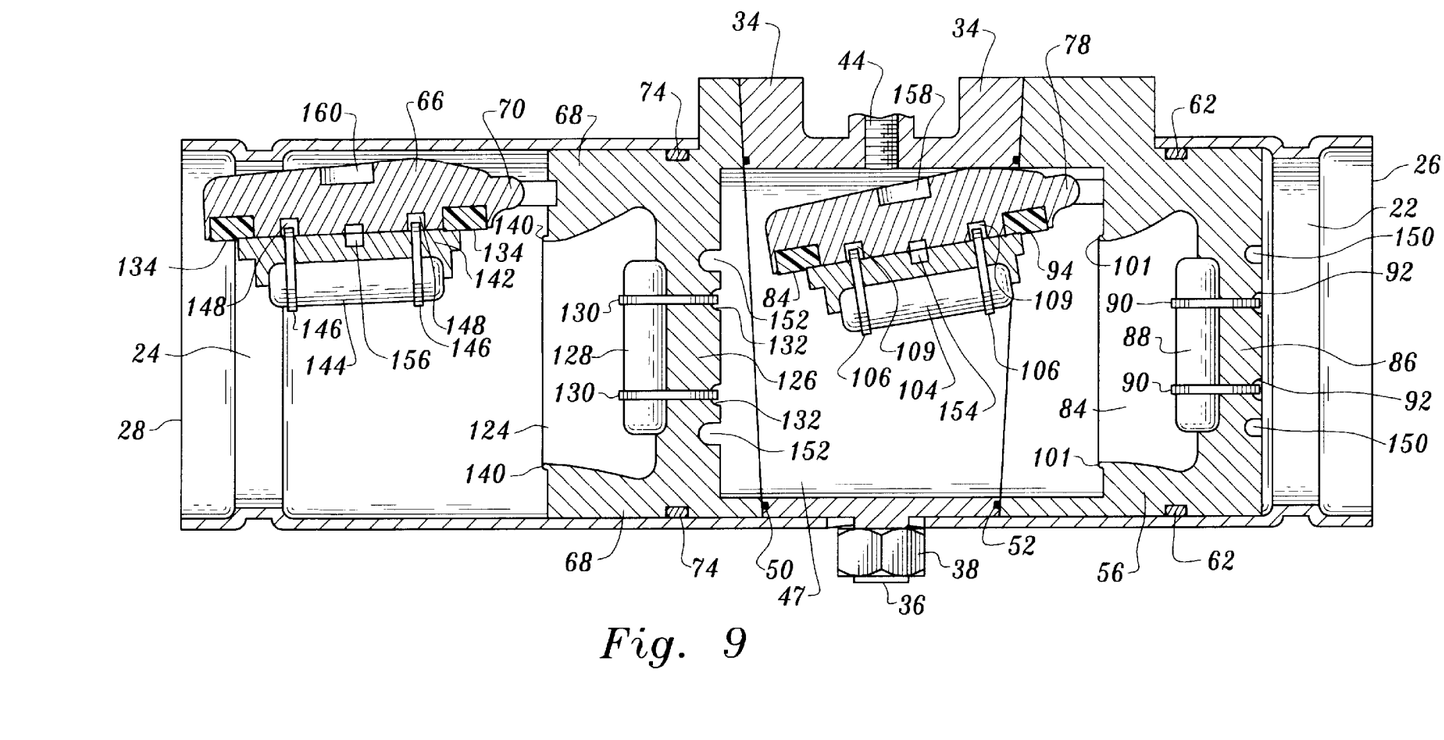
FIG. 9 is a side elevation view of the backflow prevention apparatus of is FIG. 1 shown in cross-section through line 7—7, showing the check valves in an open or flow position.

Referring also to FIG. 4, hinge assembly of FIG. 3 is shown to include generally a pintle or pivot 78 on clapper 54 and "L"-brackets 80 and bolts 82, with "L"-brackets 80 pivotally coupling pintle 78 to seat 56 via bolts 82. Referring also to FIG. 7 through FIG. 9, seat 56 is structured and configured to define a venturi-shaped flow path 84, with the inner surface of seat 56 being generally tapered from upstream to downstream to provide the venturi shape to flow path 84. Seat 56 includes a vertically oriented member 86 positioned generally in the center of flow path 84. A bar magnet 88 provides magnetic bias means, and is coupled to vertical member 86 via plastic ties 90, which encircle magnet 88 and vertical member 86, and which fit within slots 92 in vertical member 86.

Referring to FIG. 6 through FIG. 9, clapper 54 of upstream check valve module 14 includes an annular seal 94 and a back plate 96, with annular seal 94 coupled to clapper 54 by back plate 96 and bolts 98 which extend through bores 100 in back plate 96 to engage corresponding bores (not shown) in clapper 54. Seal 94 engages a corresponding annular lip or flange 101 on seat 56. Back plate 96 includes a centrally located mounting element 102 which supports a magnet 104. Seal 94 and lip 101 provide driptight means for maintaining a small positive pressure differential under static conditions.

Figure 6:
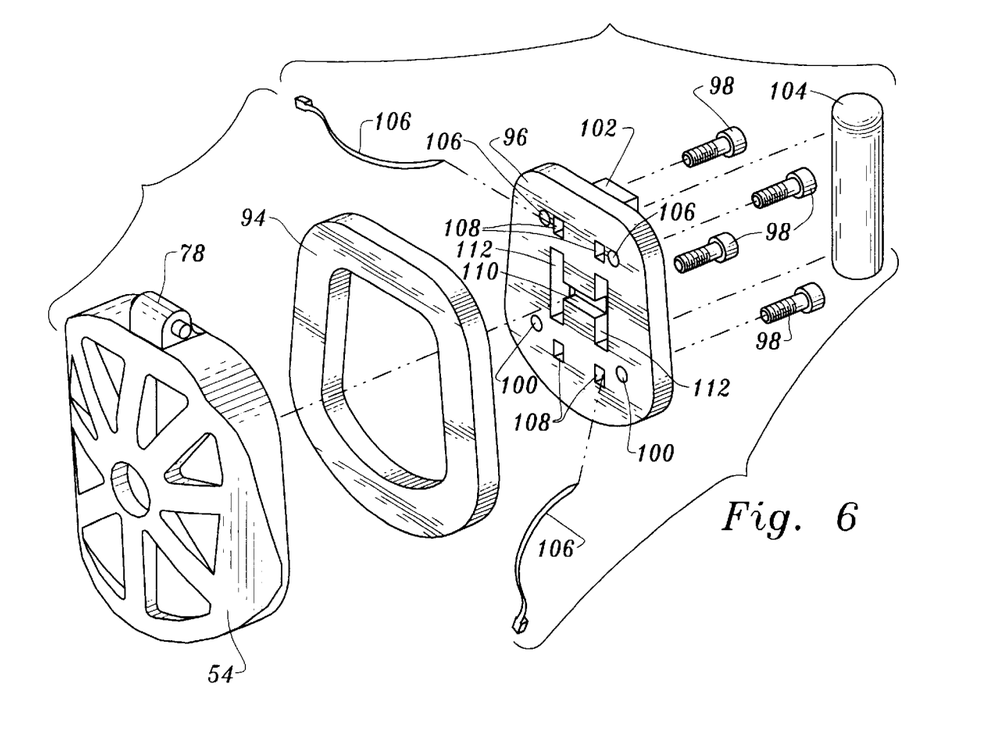
FIG. 6 is an exploded view of a check valve clapper in accordance with the invention.

Magnetic bias means are further provided by magnet 104, which is coupled to mounting element 102 and back plate 96 via plastic ties 106 which extend through square holes 108 in back plate 96. Notch or groove 109 is provided on clapper 54 to accommodate ties 106. Back plate 96 additionally includes a horizontal slot 110 and a pair of vertical slots 112 which can accommodate additional or alternative bias means (not shown), for clapper 54. Magnet 104 on clapper 54 is positioned in an opposing relationship with respect to magnet 88 on seat 56, such that magnets 104, 88 exert a mutually attractive force against each other which serves as a closure force for clapper 54 to hold clapper 54 in a closed position against seat 56, as shown in FIG. 7. Since clapper 54 is hinged to the top edge of seat 56, gravitational force on clapper 54 provides an auxiliary, additional or secondary closure force. Thus the mutually attractive force exerted by magnets 88, 104 provides a main or primary closing force, while gravity, as provided by the top-hinged arrangement of clapper 54 and seat 56, provides an auxiliary closure force. Clapper 54 could alternatively be hinged to the bottom edge of seat 56 so that gravity is not involved as a closure force. Other bias means, such as spring, elastomer or other conventional closure force means for check valves, may used alternatively to, or in addition to, magnets 88, 104, for exerting a closing force against clapper 54.

Referring again to FIG. 3 and FIG. 5, hinge assembly 70 of downstream check valve module 16 includes a pivot or pintle element 114 which is pivotally coupled to seat 68 by "L"-brackets 116 and bolts 118, with bolts 118 engaging bores 120 in slot 122 on seat 68. Referring also to FIG. 7 through FIG. 9, seat 68 is structured and configured to define a venturi-shaped flow path 124, with the inner surface of seat 68 being generally tapered in shape from upstream to downstream to impart the venturi shape to flow path 124.

Seat 68 includes a vertically oriented member 126 positioned in the center of flow path 124. Magnetic bias means are provided in the form of bar magnet 128, which is coupled to vertical member 126 via plastic ties, 130, with ties 130 encircling magnet 128 and vertical member 126 and fitting within slots 132 in vertical member 126.

Referring particularly to FIG. 7 and FIG. 8, clapper 66 of downstream check valve 16 includes an annular seal 134 and a back plate 136, with annular seal 134 coupled to clapper 66 by back plate 136 and bolts 138 which fit through holes (not shown) in back plate 136 and engage bores (not shown) in clapper 66. Seal 134 engages a corresponding annular lip or flange 140 on seat 68. A mounting element 142 is centrally located on back plate 136, and a bar magnet 144 is coupled to mounting element 142 by plastic ties 146 which extend through holes (not shown) in back plate 136. Notch 148 in clapper 66 accommodates plastic ties 146. Clapper 66 and its annular seal 134, back plate 136 and other components are generally identical to clapper 54 as shown in FIG. 6 and described above. Magnet 144 on clapper 66 is positioned in an opposing relationship with respect to magnet 128 on seat 68, such that magnets 144, 128 exert a mutually attractive force which serves as a closure force for clapper 66 to hold clapper 66 in a closed position against seat 66, as shown in FIG. 7. A clapper 66 is hinged to the top edge of seat 68, the action of gravity on clapper 66 provides an additional or secondary closure force which holds clapper 66 against seat 68. Thus the mutually attractive force exerted by magnets 128, 144 provides a main or primary closing force for clapper 66, while gravity, as provided by the top-hinged arrangement of clapper 66 and seat 68, provides an auxiliary closure force. Clapper 66 could alternatively be hinged to the bottom edge of seat 68 so that gravity is not involved as a closure force. Other bias means, such as spring, elastomer or other conventional closure force means for check valves, may used alternatively to, or in addition to, magnets 128, 144, for exerting a closing force against clapper 66.

The backflow prevention apparatus 10 is assembled by positioning upstream check valve module 14 in lateral opening 20 of primary housing component, and fitting the seat portion 56 of check valve module 14 into the tubular interior of primary housing component and pushing seat portion 56 towards the upstream end 26 of primary housing component 12 until wall section 30 is adjacent or abuts upstream edge 60 of lateral opening. Downstream check valve module 16 is then positioned within lateral opening 20, and the seat portion 68 thereof is fitted into the tubular interior of primary housing component 12 until wall section 32 abuts downstream edge 72 of lateral opening 20. Central housing component 18 is then placed in lateral opening 20 between upstream and downstream check valve modules 14, 16 and is positioned so that flow paths 124, 47 and 84 of downstream check valve module 16, central housing module 18 and upstream check valve module are generally contiguous and so that bolt 36 on central housing module extends through a corresponding bore 148 (FIG. 7) in primary housing component 12. Central housing module 18, and upstream and downstream check valve modules 14, 16, preferably are slightly tapered in shape, as can be seen most clearly in FIG. 7, to facilitate the insertion and positioning of central housing module 18 between upstream and downstream check valve modules 14, 16.

Once thus assembled, central housing module 18 is secured in position by tightening nut 38 onto bolt 36. When thus assembled, fluid-tight seal 62 is positioned between primary housing component 12 and upstream check valve module 14, and fluid-tight seal 74 is positioned between primary housing component 12 and downstream check valve module 16. Fluid-tight seals 50, 52 are positioned between central housing component 12 and upstream and downstream check valves 14, 16 respectively. Bolts 40 and nuts 42 may be used to further secure upstream and downstream check valve modules 14, 16 to central housing module 18 to ensure effective fluid sealing therebetween. Primary housing component 12, together housing or wall sections 30, 32, 34 on modules 14,16, 18 respectively, define generally a complete valve body for the apparatus 10, and housing or wall sections 30, 32, 34 define a cover for lateral opening 20.

The backflow prevention apparatus 10, when assembled as described above, is then ready for coupling into a fluid line or pipe (not shown) via coupling grooves 22, 24 in a conventional manner. Backflow prevention apparatus will typically be positioned between upstream and downstream shutoff valves in the fluid line to allow fluid shutoff during inspection or maintenance of the apparatus 10.

Under static, non-flow conditions, as shown particularly in FIG. 7, the magnetic closure force exerted by oppositely positioned, mutually attractive magnets 88, 104 hold clapper 54 against seat 56 such that annular seal 94 engages annular lip 104 provide a fluid tight seal between clapper 54 and seat 56. Likewise, the magnetic closure force provided by opposingly positioned, mutually attractive magnets 128, 144 maintain clapper 66 against seat 68 to provide a fluid tight seal between clapper 66 and seat 68. When clapper 54 is closed, magnets 88, 104 are positioned generally in the center of flow path 84 of seat 56, as can be seen most clearly in FIG. 8. Likewise, when clapper 66 is in the closed position, magnets 128, 144 are positioned generally in the center of flow path 124 of seat 68. Note that magnets 88, 104, and magnets 128, 144, are positioned, structured and configured such that they do not come into contact with each other when their respective clappers and seats are in the closed position, as can be seen most clearly in FIG. 7.

When the upstream fluid pressure is greater than downstream fluid pressure, upstream fluid pressure is applied against clapper 54, and, once the force exerted against the upstream clapper 54 by the upstream fluid exceeds the closure force exerted by magnets 88, 104 and gravity against clapper 54, clapper 54 pivotally opens to allow fluid flow in the direction of arrow F. Once upstream clapper 54 has opened, upstream fluid force then affects downstream clapper 56, and, when upstream fluid force exerted against clapper 66 exceeds the closure force exerted by magnets 128, 144 and gravity, clapper 66 opens as well. FIG. 8 shows both clappers 54, 66 open under flow conditions.

When static conditions return, or if a flow reversal or back pressure condition occurs, clappers 54, 66 undergo rapid and accurate closure according to their respective magnetic closure forces to prevent potentially contaminated downstream fluid from reach uncontaminated upstream fluid. Vent 44 and valve 46 allow potentially contaminated fluid to be removed from the region between upstream and downstream clappers 54, 66. The magnetic closure force exerted by magnets 88, 104, may the same as, or different from, the magnetic closure force exerted by magnets 128, 144, as required, or depending upon the particular use or application of the invention.

The use of centrally located, dual, oppositely positioned, mutually attractive magnets 88, 104, and 128, 144,in upstream and downstream check valve assemblies 14, 16 respectively, together with the annular lip and seal arrangement as described above, provides drip tight means, in the forward flow direction, for maintaining a generally small positive pressure differential under static flow conditions for backflow prevention apparatus 10. The use of dual, opposing positioned, centrally located, mutually attractive magnets in the manner described above provides excellent operating properties under low flow rate conditions and results in very small flow losses for the backflow prevention apparatus 10. The size and location of the pairs of dual opposing magnets as provided by the invention allows the clappers 54, 66 to open at a relatively wide angle, as shown in FIG. 9, for high flow when the check valves 14, 16 are open. The non-contacting nature of the dual magnets 88, 104, and 128, 144, for check valves 14, 16 respectively, results in minimal friction, and provides for an optimized flow curve and reduced hysteresis during operation of the apparatus 10. The non-contacting arrangement of the dual opposing magnets in the closed position also reduces potential fouling problems in the closure mechanism. The absence of springs or other complex valve closure mechanisms avoids mechanical problems associated with conventional backflow prevention devices and reduces maintenance requirements.

The backflow prevention apparatus 10 is particularly advantageous when a user wishes to inspect or repair check valve modules 14, 16. In order to effect a repair in a conventional backflow preventer, it is generally necessary for a user to disconnect and remove a side port lid and then reach through a side port extension to reach the internal check valve assemblies. This operation has traditionally tended to be to be difficult and time intensive. The modular nature of the present invention, however, eliminates the need for a side port extension and lid, and greatly facilitates the inspection and repair of check valves. In order to access the check valves associated with check valve modules 14, 16, a user need only remove nut 38 from bolt 34 on central housing module18, and remove nuts and bolts 40, 42 from central housing module and check valve modules 14, 16, 18. Since nuts 38, 42 and bolts 40 are externally located, this is easily carried out. Then, instead of having to reach into primary housing component 12 to investigate check valves, the user can disengage and remove central housing module 18 from between check valve modules 14, 16, and then disengage and remove check valve modules 14, 16 and inspect or make repairs thereto outside of main housing component 12. When inspection or repair is complete, the apparatus is re-assembled as described above. The use of simple plastic ties 90, 106, 130, 146 to hold magnets 88, 104, 128, 144 in place facilitates the interchanging magnets to provide different closure forces for different flow conditions, or to clean or replace magnets in case of wear or fouling.

The apparatus 10 may comprise additional bias means for exerting closure force on clappers 54, 66, which are used together with the aforementioned magnetic closure arrangement of the invention. Referring particularly to FIG. 7 through FIG. 9, slots 150, 152 are provided on members 86, 126 of seats 56, 68 respectively. Channels 154, 156 are provided on clappers 54, 66 respectively. Slots 150, 152 and channels 154, 156 are structured and configured to accommodate elastomeric rings or bands (not shown) which couple members 86, 126 to clappers 54, 66 respectively. The elastomeric bands exert a bias against clappers 54, 66 towards seats 56, 68 respectively, to provide an additional or auxiliary closure force. The elastomeric bands or rings are interchangeable so that the size and strength (bias) provided can be varied as desired. Additional features, such as a pulley mechanism or spring (not shown), may be used in conjunction with the elastomeric bands.

Clappers 54, 66 each include an indent 158, 160 respectively which can be modified to accommodate a poppet valve (not shown). Poppet valves may thus be installed in clappers 54, 66 to provide an additional path for fluid flow under particular conditions. The poppet valves are biased separately from clappers 56, 66, and generally open under lower upstream flow pressure.

While the check valve assemblies 14, 16 of the invention are preferably modular in nature as described above, check valve assemblies may alternatively comprise separate parts or components which are coupled to valve body 12 against an internal seat (not shown) by bolts or other hardware. In such an arrangement, central housing module 18 could be omitted, and a separate lid or cover (not shown) could be placed over lateral opening 20 and secured to body 12 in a conventional manner. Various other manners of coupling or placing check valve assemblies 14, 16 within housing 12 will suggest themselves to those skilled in the art, and are considered to be within the scope of this disclosure. Housing 12, and the various parts of check valve assemblies 12, 14 and central component 18, are preferably manufactured from metal or metallic alloy and/or plastic or resin materials in a manner which is standard in the art. The seals and 0-rings are preferably manufactured from resilient polymeric material.

Accordingly, it will be seen that this invention provides a double check valve backflow prevention apparatus of lightweight, compact, modular construction which provides low flow losses and which maintains a small positive pressure differential under static flow conditions through use of a magnetic closure mechanism. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A backflow prevention apparatus, comprising:
   (a) a valve housing, said valve housing having a flow stream;
   (b) at least one check valve assembly, said check valve assembly comprising a clapper and a seat, said check valve assembly positioned within said valve housing in said flow stream;
   (c) said check valve assembly including a first magnet centrally mounted on said clapper and a second magnet centrally mounted on said seat, said first and second magnets centrally located in said flow stream; and
   (d) drip tight means, associated with said check valve assembly, for maintaining a small positive pressure differential under static conditions.

2. A backflow prevention apparatus as recited in claim 1, further comprising auxiliary bias means, associated with said check valve assembly, for exerting a closure force on said clapper.

3. A backflow prevention apparatus as recited in claim 1, wherein said drip tight means comprises a lip and a resilient seal, said lip and said resilient seal associated with said clapper and said seat of said check valve assembly, said lip structured and configured to sealingly engage said resilient seal.

4. A backflow prevention apparatus as recited in claim 1, wherein said seat of said check valve assembly defines a flow path, said flow path having a venturi shape.

5. A backflow prevention apparatus as recited in claim 2, wherein said auxiliary bias means comprises hinge means for pivotally coupling said clapper to said seat, said hinge means positioned to allow gravity to act as a closure force on said clapper.

6. A backflow prevention apparatus, comprising:
(a) a valve housing, said valve housing having a flow stream;
(b) a first check valve assembly, said first check valve assembly comprising a first clapper and a first seat, said first seat defining a first flow path, said first check valve assembly positioned within said valve housing in said flow stream;
(c) a second check valve assembly, said second check valve assembly comprising a second clapper and a second seat, said second seat defining a second flow path, said second check valve assembly positioned within said valve housing in said flow stream;
(d) said first check valve assembly including a first magnet centrally mounted on said first clapper and a second magnet centrally mounted on said first seat, said first and second magnets centrally located in said first flow path;
(e) said second check valve assembly including a first magnet centrally mounted on said second clapper and a second magnet centrally mounted on said second seat, said first and second magnets centrally located in said second flow path;
(f) first drip tight means, associated with said first and check valve assembly, for maintaining a small positive pressure differential under static conditions; and
(g) second drip tight means, associated with said second and check valve assembly, for maintaining a small positive pressure differential under static conditions.

7. A backflow prevention apparatus as recited in claim 6, further comprising:
(a) first auxiliary bias means, associated with said first check valve assembly, for exerting a closure force on said first clapper; and
(b) second auxiliary bias means, associated with said second check valve assembly, for exerting a closure force on said second clapper.

8. A backflow prevention apparatus as recited in claim 6, wherein:
(a) said first drip tight means comprises a first annular lip and a first resilient annular seal, said first annular lip and said first resilient annular seal associated with said first clapper and said first seat of said first check valve assembly, said first annular lip structured and configured to sealingly engage said first resilient annular seal when said first clapper is in a closed position; and
(b) said second drip tight means comprises a second annular lip and a second resilient annular seal, said second annular lip and said second resilient annular seal associated with said second clapper and said second seat of said second check valve assembly, said second annular lip structured and configured to sealingly engage said second resilient annular seal when said second clapper is in a closed position.

9. A backflow prevention apparatus as recited in claim 7, wherein:
(a) said first auxiliary bias means comprises first hinge means for pivotally coupling said first clapper to said first seat, said first hinge means positioned to allow gravity to act as a closure force on said first clapper; and
(b) said second auxiliary bias means comprises second hinge means for pivotally coupling said second clapper to said second seat, said second hinge means positioned to allow gravity to act as a closure force on said second clapper.

10. A backflow prevention apparatus as recited in claim 6, wherein:
(a) said first magnet on said first clapper and said second magnet on said first seat are positioned to exert a mutually attractive force against each other; and
(b) said first magnet on said second clapper and said second magnet on said second seat are positioned to exert a mutually attractive force against each other.

11. A backflow prevention apparatus as recited in claim 6, wherein said first and second seats each define a flow path, said flow paths having a venturi shape.

12. A backflow prevention apparatus, comprising:
(a) a valve housing, said valve housing having a flow stream;
(b) a first check valve assembly, said first check valve assembly comprising a first clapper and a first seat, said first seat defining a first flow path, said first check valve assembly positioned within said valve housing in said flow stream;
(c) a second check valve assembly, said second check valve assembly comprising a second clapper and a second seat, said second seat defining a second flow path, said second check valve assembly positioned within said valve housing in said flow stream;
(d) said first check valve assembly including a first magnet centrally mounted on said first clapper and a second magnet centrally mounted on said first seat, said first and second magnets centrally located in said first flow path;
(e) said second check valve assembly including a first magnet centrally mounted on said second clapper and a second magnet centrally mounted on said second seat, said first and second magnets centrally located in said second flow path:
(f) first auxiliary bias means, associated with said first check valve assembly, for applying an auxiliary closing force on said first clapper;
(g) second auxiliary bias means, associated with said second check valve assembly, for applying an auxiliary closing force on said second clapper
(h) first drip tight means, associated with said first and check valve assembly, for maintaining a small positive pressure differential under static conditions; and
(i) second drip tight means, associated with said second and check valve assembly, for maintaining a small positive pressure differential under static conditions.

13. A backflow prevention apparatus as recited in claim 12, wherein:
(a) said first magnet on said first clapper and said second magnet on said first seat positioned adjacent to each other when said first clapper is in a closed position, said first magnet on said first clapper and said second magnet on said first seat positioned to exert a mutually attractive magnetic force on each other; and
(b) said first magnet on said second clapper and said second magnet on said second seat are positioned adjacent to each other when said second clapper is in a closed position, said first magnet on said second clapper and said second magnet on said second seat positioned to exert a mutually attractive magnetic force on each other.

14. A backflow prevention apparatus as recited in claim 13, wherein:

(a) said first magnet on said first clapper and said second magnet on said first seat are non-contacting when said first clapper is in said closed position; and (b) said first magnet on said second clapper and said second magnet on said second seat are non-contacting when said second clapper is in said closed position.

15. A backflow prevention apparatus as recited in claim 12, wherein:

(a) said first drip tight means comprises a first annular lip and a first resilient annular seal, said first annular lip and said first resilient annular seal associated with said first clapper and said first seat of said first check valve assembly, said first annular lip structured and configured to sealingly engage said first resilient annular seal when said first clapper is in a closed position; and (b) said second drip tight means comprises a second annular lip and a second resilient annular seal, said second annular lip and said second resilient annular seal associated with said second clapper and said second seat of said second check valve assembly, said second annular lip structured and configured to sealingly engage said second resilient annular seal when said second clapper is in a closed position.

16. A backflow prevention apparatus as recited in claim 12, wherein:

(a) said first auxiliary bias means comprises first hinge means for pivotally coupling said first clapper to said first seat, said first hinge means positioned to allow gravity to act as an auxiliary closure force on said first clapper; and (b) said second auxiliary bias means comprises second hinge means for pivotally coupling said second clapper to said second seat, said second hinge means positioned to allow gravity to act as an auxiliary closure force on said second clapper.

17. A backflow prevention apparatus as recited in claim 12, wherein said first and second seats each define a flow path, said flow paths having a venturi shape.

* * * * *